(12) United States Patent
Mefferd

(10) Patent No.: US 10,357,875 B2
(45) Date of Patent: Jul. 23, 2019

(54) TOOL AND RIGGING HOLDING DEVICE

(71) Applicant: Jordan T. Mefferd, Anaheim, CA (US)

(72) Inventor: Jordan T. Mefferd, Anaheim, CA (US)

( * ) Notice: Subject to any disclaimer, the term of this patent is extended or adjusted under 35 U.S.C. 154(b) by 0 days.

(21) Appl. No.: 15/797,290

(22) Filed: Oct. 30, 2017

(65) Prior Publication Data

US 2019/0126461 A1    May 2, 2019

(51) Int. Cl.
*B25H 3/04* (2006.01)
*F16M 13/02* (2006.01)
*B25H 3/00* (2006.01)

(52) U.S. Cl.
CPC .......... *B25H 3/04* (2013.01); *B25H 3/003* (2013.01); *F16M 13/02* (2013.01)

(58) Field of Classification Search
CPC .......... B25H 3/04; B25H 3/003; F16M 13/02; B66C 1/00; B66C 1/10; B66C 1/105; H02G 1/02; Y10T 29/53543
USPC .................................. 294/67.2, 67.21, 67.22
See application file for complete search history.

(56) References Cited

U.S. PATENT DOCUMENTS

| | | | | |
|---|---|---|---|---|
| 732,884 | A * | 7/1903 | Normandin | B66C 1/24 294/67.2 |
| 1,250,602 | A * | 12/1917 | Lobdell | B66C 1/24 294/142 |
| 1,695,960 | A * | 12/1928 | Hackworth | B65G 7/12 294/67.2 |
| 2,680,644 | A * | 6/1954 | Marconi | B21C 47/24 294/67.2 |
| 2,690,926 | A * | 10/1954 | Betz | B66C 1/24 294/67.21 |
| 3,897,097 | A * | 7/1975 | Davis, Jr. | B66C 1/24 294/67.1 |
| 3,930,585 | A * | 1/1976 | Lynch | B65G 59/02 414/607 |
| 4,343,172 | A * | 8/1982 | Nordlund | B25H 3/04 72/339 |
| 4,549,759 | A * | 10/1985 | Fowler, Jr. | B66C 1/24 294/67.2 |
| 5,071,183 | A * | 12/1991 | McDermott | B66C 1/24 294/67.2 |
| 6,062,449 | A * | 5/2000 | Kahn | A45F 5/02 224/268 |
| 6,655,560 | B2 * | 12/2003 | Kahn | A45F 5/02 224/197 |
| 7,470,141 | B2 * | 12/2008 | Yoest | H01R 13/6392 439/369 |
| 8,678,455 | B2 * | 3/2014 | Krogh | B66C 1/108 294/67.21 |
| 9,072,364 | B2 * | 7/2015 | Johnson | A45F 5/02 |

(Continued)

FOREIGN PATENT DOCUMENTS

CN    2010-Q42963    * 11/2010
CN    2014-L73046    *  4/2014

*Primary Examiner* — Ko H Chan
(74) *Attorney, Agent, or Firm* — Law Office of Paul B. Johnson; Paul B. Johnson

(57) ABSTRACT

A tool and rigging support bracket comprised of a durable, non-conductive plastic having an "L" shaped cross-section of up to about ½" and other dimensions of about 2.5" wide and 20" long. Multiple support holes perforate through an upper surface of the "L" shaped tool and rigging support bracket. The tool and rigging support bracket can accommodate at least 100 pounds of tools and riggings.

10 Claims, 3 Drawing Sheets

(56) References Cited

U.S. PATENT DOCUMENTS

| | | | | |
|---|---|---|---|---|
| 2004/0032138 | A1* | 2/2004 | Bancroft | B66C 1/24 |
| | | | | 294/67.22 |
| 2007/0210021 | A1* | 9/2007 | Whitehead | B25H 3/04 |
| | | | | 211/70.6 |
| 2009/0107062 | A1* | 4/2009 | Pedersen | B66C 1/108 |
| | | | | 52/223.13 |
| 2010/0078950 | A1* | 4/2010 | Inda | B66C 1/66 |
| | | | | 294/215 |
| 2011/0298230 | A1* | 12/2011 | Graham | H02G 1/02 |
| | | | | 294/67.2 |
| 2014/0097217 | A1* | 4/2014 | Walsh | A45F 5/021 |
| | | | | 224/268 |
| 2015/0151692 | A1* | 6/2015 | Sprang, Jr. | B60P 7/0823 |
| | | | | 211/70.6 |
| 2015/0209954 | A1* | 7/2015 | Hokanson | B25H 3/003 |
| | | | | 52/741.14 |

* cited by examiner

TOOL AND RIGGING HOLDING DEVICE

CROSS-REFERENCE TO RELATED APPLICATION(S)

Not applicable

BACKGROUND OF THE INVENTION

1. Field of Invention

The present invention relates to the field of tool holding devices, more particularly to a support bracket for holding tools and rigging inside aerial buckets and man baskets.

2. Description of Related Art

Aerial buckets and man buckets are widely utilized in line maintenance and repair such as on overhead suspended power lines and telephone lines. The buckets used for these maintenance and repair activities are notoriously cramped, with little stowage space for the necessary tools needed to perform work. It is not uncommon for workers to suffer minor injuries (dropped tools impacting ankles, stumbling over tools, etc) due to a cramped space cluttered with various tools.

Based on the foregoing, there is a need in the art an apparatus, which will serve as a tool and rigging holding device for aerial buckets and man baskets having limited workspace.

SUMMARY OF THE INVENTION

A tool and rigging support bracket comprised of a durable, non-conductive plastic having an "L" shaped cross-section of about ½" and other dimensions of about 2.5" wide and 20" long. Multiple support holes perforate through an upper surface of the "L" shaped tool and rigging support bracket. The tool and rigging support bracket can accommodate at least 100 pounds of tools and riggings.

At least two support slots and associated support holes to accommodate a bucket hook to suspend the tool and rigging support bracket.

The tool and rigging support bracket further comprised of at least seven support holes for attaching and accommodating tools and rigging.

The at least seven support holes comprises at least one with a diameter of about 1.625".

The at least seven support holes comprises a plurality of support holes with a diameter of about 1.5".

The durable plastic comprises a plastic selected from the group comprising acrylonitrile butadiene styrene (ABS); polyamides (PA); polycarbonate (PC); high-density polyethylene (HDPE); low-density polyethylene (LDPE); polypropylene (PP); polyvinyl chloride (PVC); and polycarbonate/acrylonitrile butadiene styrene (PC/ABS).

The "L" shaped cross-section is in the range of ⅜" to ⅝" thickness.

The tool and rigging support bracket is suspended by bucket hooks from the edge of an aerial bucket or man bucket to hang down into the interior.

At least two support holes are sized to accommodate a socket and an auger used in line maintenance and repair work.

The tool and rigging support accommodates sockets and hanging items such as impact guns and sawmills, wire grips, rigging rope blocks, and chain hoist used in line maintenance and repair work.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
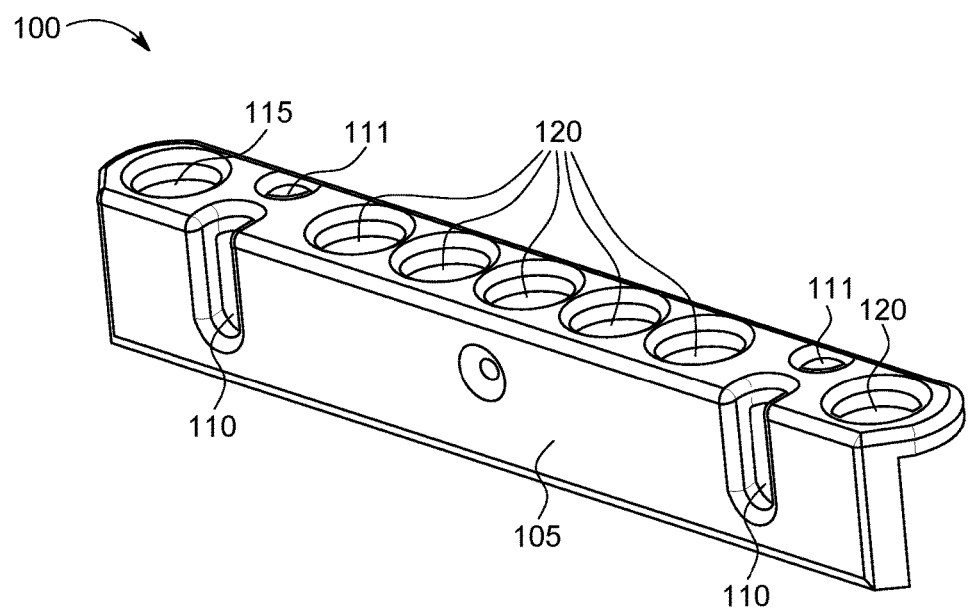
FIG. 1 is a back perspective view of the tool and rigging holding device, according to an embodiment of the present invention.
Figure 2:
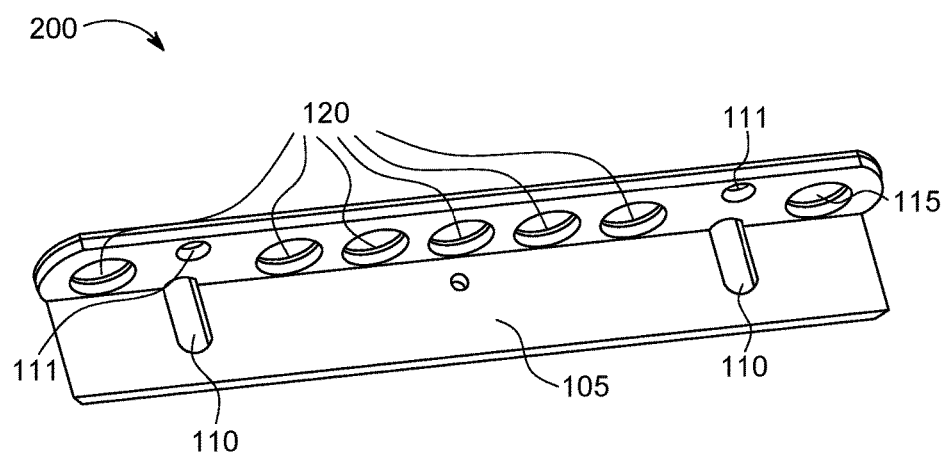
FIG. 2 is a front perspective view of the tool and rigging holding device, according to an embodiment of the present invention.
Figure 3:
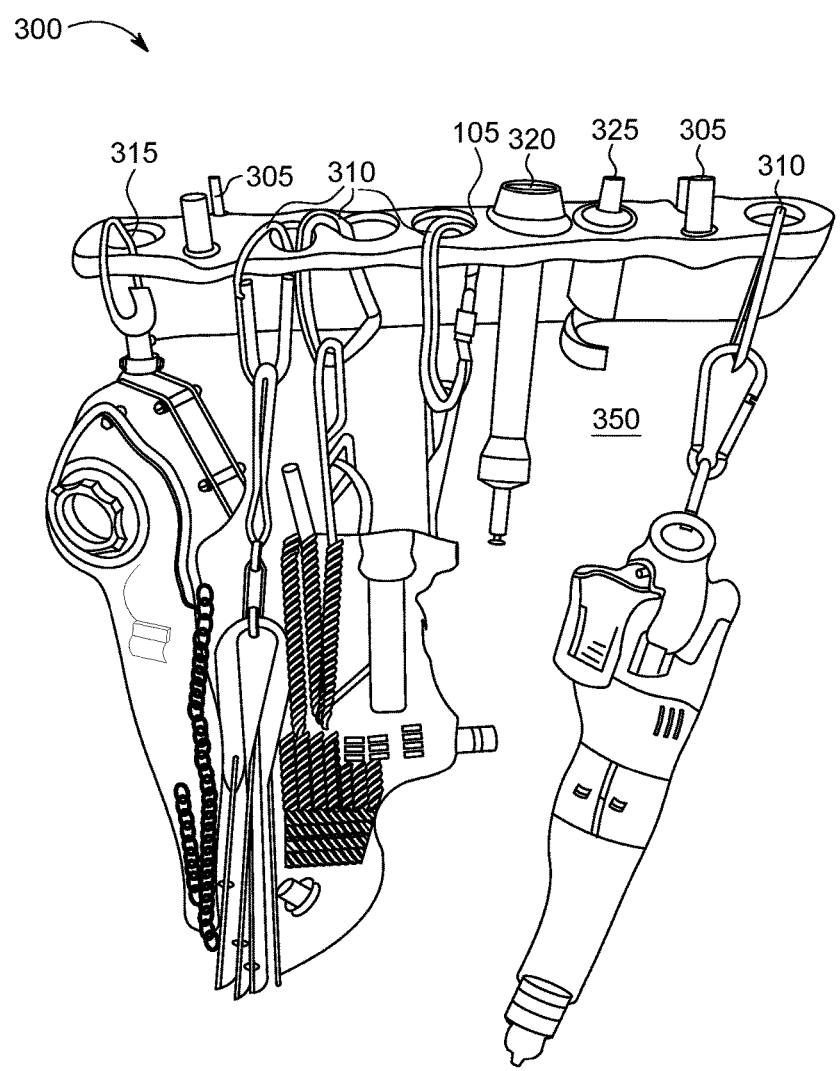
FIG. 3 is a front view of the mounted tool and rigging holding device in use with attached tools, according to an embodiment of the present invention.

Preferred embodiments of the present invention and their advantages may be understood by referring to FIGS. 1-3, wherein like reference numerals refer to like elements.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

FIG. 1 in an embodiment depicts a back perspective view 100 of the tool and rigging holding device. Tool and rigging holding device 105 can be constructed from a high density durable plastic such as an injected molded plastic. Acceptable plastic formulations can include acrylonitrile butadiene styrene (ABS), polyamides (PA), polycarbonate (PC), high-density polyethylene (HDPE), low-density polyethylene (LDPE), polypropylene (PP), polyvinyl chloride (PVC), and polycarbonate/acrylonitrile butadiene styrene (PC/ABS). These types of plastics are rigid and non-conductive plastic so as not to become energized. The plastic structure can be of sufficient durability and strength to support 100 pounds or more of tools and rigging, with a preferred thickness of about ½" and a range of ⅜" to ⅝".

Mounting slots 110 can receive and accommodate bucket hooks, which are well known in the industry, and further includes associated mounting holes 111 to fully receive supporting bucket hooks to securely hang tool and rigging holding device 105.

Tool and rigging holding device 105 can include seven support holes 115 and 120. As depicted, tool and rigging holding device 105 can include one hole about 1.625" in diameter and six 1.5" in diameter in an embodiment. These holes can easily accommodate clipping in a variety of caribiners or hooks so that tools and rigging can be hung and supported from tool and rigging holding device 105. The overall structure of tool and rigging holding device 105 can be constructed with an "L" shaped cross-section of about ⅜" to ⅝" thickness, with a preferred thickness of about ½" thickness, with the seven support holes located in the upper surface of the "L".

In an embodiment, tool and rigging holding device 105 can measure about 2.5×19.750 inches to fit into a cramped working space, such as in an aerial buckets and man buckets. Alternatively, tool and rigging holding device 105 can be hooked onto the aerial bucket and man bucket to hang down on the exterior rather than the interior.

FIG. 2 in an embodiment depicts a back perspective view 200 of the tool and rigging holding device 105. Tool and rigging holding device 105 can be constructed from a high density durable plastic such as an injected molded plastic exhibiting rigidity and non-conductivity, and sufficient durability and strength to support 100 pounds or more of tools and rigging.

Mounting slots 110 can receive and accommodate bucket hooks, which are well known in the industry, and further includes associated mounting holes 111 to fully receive supporting bucket hooks to securely hang tool and rigging holding device 105. Further, tool and rigging holding device 105 can include seven support holes 115 and 120, which can include one hole about 1.625" in diameter and six holes about 1.5" in diameter.

FIG. 3 is a front view of the mounted tool and rigging holding device 105 in use with attached tools 300. Tool and rigging holding device 105 can include bucket hooks 305, which can be hooked over an edge of an aerial or man bucket 350. In an embodiment, various tools and equipment can be suspended from tool and rigging holding device 105 by attached carabiners 310, by an equipment fastener 315, a socket 320, and an auger 325.

In an embodiment, the tool and rigging holding device 105 can accommodate sockets used in the line industry (at least two in an embodiment) and additional storage space used for hanging items such as impact guns and sawmills, wire grips, rigging rope blocks, and chain hoist.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A tool and rigging support bracket, consisting of:
   a single piece of polymer having an L shape, the L shape having a cross-section, perpendicular to a longest length of the single piece of polymer, between ⅜" and ⅝" in thickness;
   multiple support holes perforated through an upper surface of the L shape for attaching and accommodating tools and riggings, and;
   at least two mounting slots and at least two associated mounting holes comprised in the single piece of polymer to accommodate two bucket hooks to suspend the tool and rigging support bracket;
   wherein the tool and rigging support bracket can accommodate at least 100 pounds of tools and riggings.

2. The tool and rigging support bracket of claim 1, wherein each of the multiple support holes is fully enclosed in at least one plane of the single piece of polymer.

3. The tool and rigging support bracket of claim 1, wherein the multiple support holes comprise at least seven support holes.

4. The tool and rigging support bracket of claim 1, wherein at least one of the support holes comprises a diameter of about 1.625" and at least one of the support holes comprises a diameter of about 1.5".

5. The tool and rigging support bracket of claim 1, wherein at least one of the support holes is sized to accommodate a socket used in line maintenance and repair work, and wherein the support hole sized to accommodate the socket is located closer to a center of the single piece of polymer than it is to the at least two associated mounting holes.

6. The tool and rigging support bracket of claim 3, wherein none of the at least seven support holes comprises a diameter smaller than 1.5".

7. The tool and rigging support bracket of claim 1, wherein the associated mounting holes are comprised in the upper surface of the L shape.

8. The tool and rigging support bracket of claim 1, wherein the at least two mounting slots are comprised at least partly in the upper surface of the L shape and at least partly in a vertical side surface of the L shape.

9. A method of use of a tool and rigging support bracket, consisting of:
   providing a single piece of polymer having an L shape, the L shape having a cross-section, perpendicular to a longest length of the single piece of polymer, between ⅜" and ⅝" in thickness, the single piece of polymer comprising multiple support holes perforated through an upper surface of the L shape, the single piece of polymer comprising at least two mounting slots and at least two associated mounting holes;
   coupling two bucket hooks with the single piece of polymer by inserting each bucket hook through one of the mounting slots and one of the associated mounting holes;
   suspending the single piece of polymer from an edge of an aerial bucket using the bucket hooks, and;
   hanging a plurality of tools and riggings from the multiple support holes.

10. The method of claim 9, wherein each of the at least two mounting slots perforates through the upper surface of the L shape and perforates through a vertical side surface of the L shape, and wherein each of the associated mounting holes perforates through the upper surface of the L shape.

* * * * *

UNITED STATES PATENT AND TRADEMARK OFFICE
CERTIFICATE OF CORRECTION

PATENT NO. : 10,357,875 B2  
APPLICATION NO. : 15/797290  
DATED : July 23, 2019  
INVENTOR(S) : Jordan T. Mefferd Page 1 of 1

It is certified that error appears in the above-identified patent and that said Letters Patent is hereby corrected as shown below:

In the Specification

Column 1, Line 26, replace "art an" with -art for an-.
Column 1, Line 40, replace "holes to" with -holes-.
Column 1, Line 43, replace "comprised of" with -comprises-.
Column 1, Line 64, replace "support accommodates" with -support bracket accommodates-.
Column 4, Line 4, replace "implementation any" with -implementation of any-.
Column 4, Line 7, replace "may configured" with -may be configured-.
Column 4, Line 28, replace "non-conductive plastic" with -non-conductive plastics-.
Column 4, Line 42, replace "clipping in" with -clipping in of-.
Column 4, Line 52, replace "as in an aerial" with -as in aerial-.
Column 4, Line 54, replace "aerial bucket and man bucket" with -aerial bucket or man bucket-.
Column 4, Line 64, replace "and further" with -and the device further-.
Column 5, Line 4, replace "front view" with -front view 300-.
Column 5, Line 5, replace "attached tools 300" with -attached tools-.
Column 5, Line 10, replace "fastener 315, a" with -fastener 315, and the device can also hold a-.
Column 5, Line 14, replace "additional storage space" with -additional storage space may be-.

Signed and Sealed this  
Third Day of September, 2019

Andrei Iancu  
*Director of the United States Patent and Trademark Office*